UNITED STATES PATENT OFFICE 2,640,023

PHOTOCHEMICAL PRODUCTION OF BRANCHED PARAFFINIC HYDROCARBONS

Harry E. Cier, Baytown, Tex., assignor, by mesne assignments, to Standard Oil Development Company, Elizabeth, N. J., a corporation of Delaware No Drawing. Application December 29, 1949, Serial No. 135,841

6 Claims. (Cl. 204—162)

The present invention is directed to a method for synthesizing branched chain hydrocarbons. More particularly, the invention is directed to a method for synthesizing branched chain hydrocarbons from two or more saturated hydrocarbons.

It is known that hydrocarbons can be made to react by the so-called "free radical" mechanism. The formation of free radicals from a saturated hydrocarbon molecule involves the breaking of either a C-C or a C-H bond. Although the bond energies of the C-H bonds in a hydrocarbon molecule are greater than the bond energies of the C-C bonds in the molecule, it is possible to attack preferentially the C-H bonds, in a type of reaction wherein the hydrocarbon molecule collides with a metal atom which has been excited by radiant energy of a resonance frequency to a state wherein its energy is greater than the energy of the C-H bond to be broken. The energy of the C-H bond, or in other words, the amount of energy required to break a particular bond, depends primarily upon the nature of the bond, i. e. whether it is primary, secondary, or tertiary, and to a lesser extent upon the molecular weight of the hydrocarbon. In all cases it has been found that in any particular hydrocarbon molecule the energy of the primary C-H bond is the greatest, that of the secondary C-H bond less, and that of the tertiary C-H bond the least. This relationship, as well as the variation of bond strength with molecular weight, may be observed from Table I below in which the bond energies which have been established for certain particular C-H bonds in various hydrocarbon molecules is tabulated.

TABLE I

| Compound | C-H Bond | N[1] | Bond Energy in Kilocalories |
|---|---|---|---|
| Methane | Primary | 4 | 102 |
| Ethane | do | 6 | 97.5 |
| Propane | Secondary | 2 | 90.8 |
| n-butane | do | 4 | 88 |
| Isobutane | Tertiary | 1 | 86.5 |
| n-pentane | Secondary | 6 | 88.5 |
| Isopentane | Tertiary | 1 | 86 |

[1] N=number of hydrogens of that type (i. e., primary, secondary, tertiary) in molecule.

The main object of the present invention is to produce a branched chain hydrocarbon by the reaction of one saturated hydrocarbon with a saturated hydrocarbon having a different molecular structure, through the agency of radiant energy.

It is a further object of my invention to provide a process wherein the maximum yield of a desired branched chain hydrocarbon, the product of the combination of two hydrocarbons of different molecular structure, is obtained by charging these two reactant hydrocarbons in a ratio which is a function of the strength of the weakest C-H bond in each molecule and the number of such bonds in each molecule.

I have now found that in a reaction where it is desired to react a paraffin hydrocarbon "R₁H" with another paraffin hydrocarbon "R₂H" under the influence of an excited metal sensitizer, an increased yield of the desired combination product "R₁R₂" may be obtained at the expense of a decrease in yield of the sum of less desired products R₁R₁ and R₂R₂ by proportioning the reactant hydrocarbons in the feed in a ratio which is a function of the difference of the bond energies of the weakest C-H bond in each molecule, the number of occurrences of the respective C-H bond in each molecule, and the reaction temperature. The proportion of reactants in the feed mixture is preferably in the ratio calculated from Formula 1 given hereinbelow, in order to permit the maximum yield of desired product R₁R₂ to be obtained. Although it has been found that the highest yield of R₁R₂ is obtained when employing a ratio of reactants calculated by the value calculated by Equation 1, it will be apparent that consideration of availability of feed stocks or other commercial reasons may make it necessary at times to deviate to some extent from that ratio. In such cases, other ratios of reactants may be employed, in the range of from one-half to two times the calculated ratio, without too great a sacrifice in the yield of R₁R₂. For example, the desired ratio of R₁H to R₂H, calculated for a particular case by using Equation 1 set out hereafter, may turn out to be 9:1. Therefore, the preferred feed stock will contain 90 mol per cent of R₁H and 10 mol per cent of R₂H. However, too great a loss of product R₁R₂ may not be suffered by employing a feed stock in which the ratio of R₁H to R₂H is as low as 4.5:1 and the feed composition consequently is 82 mol per cent R₁H and 18 mol per cent R₂H; or, on the other hand, a feed stock in which the ratio of R₁H to R₂H is as high as 18:1 and the feed composition consequently is 94.7 mol per cent of R₁H and 5.3 mol per cent of R₂H.

The formula employed for calculating the preferred ratio of reactants is:

1) $$R_1H : R_2H = \frac{N_2}{N_1} e^{\frac{E_1 - E_2}{2RT}}$$

In this equation $N_1$ is the number of the most weakly held hydrogens in reactant hydrocarbon $R_1H$; $N_2$ is the number of most weakly held hydrogens in reactant hydrocarbon $R_2H$; $e$ is the base of natural logarithms, namely 2.718; $E_1$ is the bond energy of the weakest C-H bond in reactant $R_1H$; $E_2$ is the bond energy of the weakest C-H bond in reactant $R_2H$; $R$ is the so-called "gas constant"; and $T$ is the absolute temperature at which the reaction takes place. In this equation $E_1$ and $E_2$ may be expressed in calories per mol, $T$ is degrees K., and the gas constant $R$, in that case, is 1.986 calories per degree per mol. Units of other consistent systems of measurement may also be employed. Although it is not necessary, it is convenient to arrange the calculation such that $E_1$ is greater than $E_2$.

It will be seen from this equation that the preferred ratio of reactants depends to a considerable extent upon the difference between the energies of the weakest C-H bond in the respective molecules. However, in cases where the bond energies are substantially the same for both molecules, the term $E_1-E_2$ will be approximately 0 and consequently the preferred ratio of reactants $R_1H:R_2H$ will be about inversely proportional to the number of occurrences of the weakest C-H bond in each molecule. I have found that this is indeed the case, and that, in order to obtain the maximum yield of the branched chain hydrocarbon which is a combination product of the two reactants, the charge to the reactor should contain the reactants, in which the bond energies are about the same, in the inverse ratio of their number of weakest C-H bonds.

The present invention may be briefly described as involving the reaction, in the presence of a metal sensitizing agent which is activated by radiant energy, of a first saturated hydrocarbon with a second saturated hydrocarbon of different molecular structure and/or weight, wherein the ratio of said first hydrocarbon to second hydrocarbon in the feed to the reaction is maintained at a value which is a function of the difference of the bond energies of the weakest C-H bond in each molecule, the number of occurrences of the respective C-H bond in each molecule, and the reaction temperature. After the reaction has been completed, the reaction products, which are primarily saturated hydrocarbons having a highly branched structure, are separated from the metal sensitizing agent, which is usually present in only very small quantities, and the unconverted portion in the reaction product may be resubjected to contact with a metal sensitizing agent and exposed to radiant energy again to cause further reaction thereof.

The metal sensitizing agent employed in the present invention may be any metal which meets the conditions set out below, including proper vapor pressure, light absorption characteristics, and energy content in the activated state. Whatever metal sensitizer is employed is incorporated in the reaction mixture of hydrocarbons, and the mixture is subjected to radiant energy containing frequencies which are capable of energizing the metal sensitizer. In selecting a metal sensitizer and a source of radiant energy for the reaction, the following conditions must be met:

(A) The vapor pressure of the metal employed as a sensitizer must be sufficient to insure that metal vapor is present in the hydrocarbon mixture in a concentration sufficient to absorb the activating light efficiently and to an extent that will permit rapid reaction to take place; conveniently, this vapor pressure is at least 0.001 mm. of mercury at a temperature below about 650° F.

(B) The radiant energy must be of a frequency that can be absorbed by the metallic sensitizer in its ground state in the hydrocarbon mixture. This frequency must correspond to at least one of the resonance lines of the metal sensitizer.

(C) The sum of the energy of the resonance frequency absorbed by the metal sensitizer and of the energy of the metal-hydrogen bond must correspond to an energy content equal to or in excess of that required to rupture one of the paraffin C-H bonds.

While a number of metal sensitizing agents will fill some of the foregoing requirements, the preferred metal sensitizing agents in carrying out my invention are the metals of subgroup B of group II of the periodic table, namely mercury, cadmium and zinc. While either of these metals may be employed in my process, mercury will be preferred because of its availability, vapor pressure, activation energy, and other peculiar properties.

In order to illustrate the resonance lines of the metallic sensitizers suitable for practice in the present invention, the following table is presented:

TABLE II

| Element | Resonance Lines, Å. |
|---|---|
| Hg | 2,537 <br> 1,850 |
| Cd | 3,261 <br> 2,289 |
| Zn | 3,076 <br> 2,139 |

The saturated hydrocarbons finding use in the present invention include, as pairs, ethane and propane, propane and isobutane, propane and n-butane, propane and n-pentane, propane and isopentane, n-butane and isopentane, n-butane and isobutane, isobutane and isopentane, propane and 2,2-dimethyl butane, propane and 2,3-dimethyl pentane, and many more pairs of saturated hydrocarbons too numerous to mention here, but illustrated by the foregoing pairs of reactants. In general, due to its relative inactivity, methane will not be a desirable reactant. However, my invention may be employed in methylation reactions, such, for example, as the reaction of methane and n-butane to produce isopentane.

The reaction may be conducted at a temperature in the range from about 80° to 650° F. and pressures may be substantially atmospheric and ranging upwardly therefrom. The temperature and pressure within the range given will be selected to provide a vapor phase.

The process of the present invention is not limited to any particular type of equipment. The reaction has been carried out satisfactorily in an annular reactor consisting of a cylindrical outer Pyrex jacket provided with an inlet at one end and an outlet at the other end, the inner cylinder emanating light of the desired wave length. For example, when it is desired to employ mercury as the metallic sensitizer, a mercury vapor lamp emanating light of 2537 Å. wave length is inserted as concentric inner cylinder in the Pyrex jacket. When employing mercury as a sensitizer, the lamp should be operated in such a manner that an unreversed 2537 Å. line is obtained. A satisfactory lamp for such a purpose is, for example, the 15 watt "T-8 Germicidal Lamp," or a lamp such as described in U. S. Patent 2,473,642 to Found et al.

When cadmium is used as the metallic sensitizer, a cadmium lamp may be employed. The reactor jacket may be surrounded with a suitable heating means such as an electric heater or a furnace. In converting the mixture of paraffinic hydrocarbons to other branched chain hydrocarbons, the paraffinic hydrocarbon feed is vaporized and introduced into the jacket through the inlet, and the products of reaction are withdrawn through the outlet. In carrying out a mercury-sensitized reaction, a satisfactory method of maintaining mercury sensitizer in the reactor has been to place a small amount of metallic mercury into the reactor jacket prior to the beginning of the reaction. Other satisfactory methods of introducing metal sensitizers are known; for example, a carrier stream, consisting of the vaporized hydrocarbon feed, or a portion thereof, or an inert gas, such as nitrogen, may be passed through a vessel containing the metal sensitizer in the liquid or vapor state prior to passing said carrier stream into the reaction.

In preparing the feed stock for carrying out the process according to my invention, the conventional methods of purification, such as absorption or fractionation, may be employed. The two reactant paraffin hydrocarbons may be prepared in separate streams of high purity and combined in the desired proportion prior to being fed into the reactor. High purity reactant streams are, however, not essential to the carrying out of my invention. Particularly, it is not disadvantageous for the feed stream to contain compounds which are considerably less reactive at the reaction conditions employed than the reactant whose product is desired. Attention should be paid to the exclusion of impurities which may react with the feed or sensitizer to produce undesirable contaminating compounds. For example, water vapor, in low concentration, may not be harmful to the mercury sensitizer, but it may oxidize cadmium. Reactive compounds other than the hydrocarbons desired to react will cause side reactions to take place which may form less desirable products. However, they may not cause the sensitizer to deteriorate.

The effluent leaving the reactor in which a process according to my invention is carried out may contain unconverted feed hydrocarbons as well as the branched chain product. The total effluent may be subjected to condensation to recover the feed and product in the liquid phase, and hydrogen and other non-condensibles in the gas phase. A part of the total liquid effluent may be recycled to the reactor to increase the yield of branched chain product from the original feed, and a part or all of the total liquid effluent may be subjected to fractional distillation in order to recover the branched chain hydrocarbon products in substantially pure form.

If the rate of flow through the reactor is such that appreciable quantities of the metal sensitizer are carried out of the reactor in the product stream, then it may be desirable to insert a device for recovering the metal sensitizer from the reactor effluent. This may be in the form of a condenser maintained at a low temperature or, in the case where mercury is the sensitizer metal, it may be a bed of a metal with which mercury may be amalgamated such, for example, as zinc or copper.

The invention will be illustrated further by the data in Table III which presents values for $E_1$, $E_2$, $N_1$, $N_2$ and the ratio of $R_1H$ to $R_2H$ for various pairs of reactants. These data were assembled by substituting the proper values from Table I into the aforementioned equation for the several pairs of reactants given, assuming a value for T of 300° Kelvin and a value for R of approximately 2 calories per degree mol. Thus the value for 2RT is 1200.

TABLE III

| Reactant Pair ($R_1H$) ($R_2H$) | $E_1$ | $E_2$ | $N_1$ | $N_2$ | $R_1H : R_2H$ |
|---|---|---|---|---|---|
| Propane-Isobutane | 90.8 | 86.5 | 2 | 1 | 17.7 |
| Ethane-Propane | 97.5 | 90.8 | 6 | 2 | 8.7 |
| Methane-Ethane | 102 | 97.5 | 4 | 6 | 63 |
| Ethane-Isobutane | 97.5 | 86.5 | 6 | 1 | 2,380 |
| Normal Butane-Isobutane | 88 | 86.5 | 4 | 1 | 0.87 |

It will be seen from Table III that the preferred ratio of propane to isobutane at a temperature of 300° Kelvin is 17.7 and that the ratio varies widely depending on the pairs of reactants employed and the temperature at which the reaction is conducted. It is noteworthy that where the reactants have the same molecular weights but different molecular structures as exemplified by normal butane and isobutane, the ratio of normal butane to isobutane is 0.87.

Several runs were then made to illustrate the invention further. In these runs the effect of varying the relative concentration of propane and isobutane on the yield of 2, 2, 3-trimethylbutane (Triptane) obtained in a mercury photosensitized reaction is illustrated.

Example I

A feed mixture was prepared comprising a mixture of propane and isobutane. The feed was vaporized and preheated to a temperature of approximately 275° F. and introduced into the inlet of an annular reactor of which a mercury lamp formed the inner cylinder and a Pyrex glass jacket formed the outer cylinder. The lamp had an energy output of over 90% of the emitted radiation in the unreversed 2537 Å. line. A small amount of liquid mercury was present in the annulus to supply mercury vapor to the hydrocarbons to act as a sensitizer for the reaction. The jacket was heated externally to maintain the temperature of the reaction zone at approximately 275° F. During the time the run was conducted the feed was continuously introduced at the inlet and product continuously withdrawn from the outlet. The residence time of the reactant hydrocarbons in the reaction zone was approximately 4 minutes. The reactor effluent was passed through condensers where the temperature was reduced to recover a liquid phase and a gas phase which were separately recovered and analyzed. The analysis of the feed and the analysis of the liquid and gases produced is reported in column 1 of Table IV.

Example II

A second feed was prepared which also contained propane and isobutane in different ratio from that in Example I. A second run was made in the same conditions as reported in Example I above with the second feed. The analysis of the feed and the liquid product is presented in column 2 of Table IV.

Example III

A third feed was prepared which contained a different ratio of propane and isobutane than that in Examples I and II. A similar run to that described for Examples I and II was made using identical conditions. The analysis of the feed stock and the product are presented in column 3 of Table IV:

TABLE IV

| Feed Gas Mol Ratio, propane : isobutane | 9.85:1 | 3.4:1 | 1.35:1 |
|---|---|---|---|
| Liquid Reactor Effluent Composition: | | | |
| 2,2,3-trimethyl butane | 27.5 | 36.5 | 27.0 |
| 2,3-dimethyl butane | 35.0 | 16.5 | 2.0 |
| 2,2,3,3-tetramethyl butane | 6.5 | 18.0 | 50.0 |
| other | 21.0 | 29.0 | 21.0 |
| Gas Analysis: | | | |
| hydrogen | 3.3 | | |
| methane | 0.2 | | |
| ethylene | 0.3 | | |
| ethane | 2.1 | | |
| propane | 88.0 | | |
| isobutane | 5.8 | | |
| normal butane | 0.1 | | |
| butylenes | 0.1 | | |
| isopentane | 0.1 | | |

Pressures obtaining for the three runs were atmospheric.

It will be seen that the triptane produced was formed by reaction of propane with isobutane, whereas the 2,3-dimethylbutane resulted from reaction of propane with itself; the 2,2,3,3-tetramethylbutane is the result of reaction of the isobutane with itself. By varying the proportions of the propane and isobutane in the reaction feed it will be quite evident from the analyses of the three products that the percentage of 2,3-dimethylbutane and 2,2,3,3 - tetramethylbutane varies as the amount of propane decreases in the reaction mixture. In short, with a large proportion of propane to isobutane the amount of triptane is increased at the expense of the 2,2,3,3-tetramethylbutane, whereas when the isobutane is present in larger quantities less of the propane is available to react to form the 2,3-dimethylbutane and the octane, 2,2,3,3-tetramethylbutane, is formed in increasing amounts. The run with the ratio of propane to isobutane of 3.4:1 resulted in the highest percentage of triptane at the expense of 2,3-dimethylbutane and 2,2,3,3-trimethylbutane.

Referring now to the equation given before and substituting a value of 275° F. which is 408° Kelvin for T and values of 90.8 for $E_1$ and 86.5 for $E_2$ and 2 for $N_1$ and 1 for $N_2$ corresponding to the reactants in the foregoing examples, it will be apparent that the ratio at a reaction temperature of 275° F. for propane to isobutane for best results is 6.9. This is confirmed by the data of Table IV which indicate that a ratio intermediate 9.85 and 3.4 will give best results for the production of the desired hydrocarbon triptane and for suppression of the reaction to form the dimers of the feed stock.

The bond energies presented in Table I are calculated values reported by investigators in the literature, based on experimental data. The manner in which such bond energies may be calculated is described in detail in an article entitled "Dissociation Energies of Carbon Bonds, and Resonance Energies in Hydrocarbon Radicals" by J. S. Roberts and H. A. Skinner in Transactions of the Faraday Society, vol XLV, p. 339–357 (1949).

The nature and objects of the present invention having been fully described and illustrated, what I wish to claim as new and useful and to secure by Letters Patent is:

1. A method for reacting a first saturated hydrocarbon with a second saturated hydrocarbon which includes the steps of forming a mixture of first and second saturated hydrocarbons having from 1 to 7 carbon atoms in the molecule in the inverse proportion of the number of occurrences of the weakest carbon-hydrogen bond in each molecule of said hydrocarbons, flowing said mixture continuously through a reaction zone, exposing the mixture in said reaction zone to a resonance frequency radiation of a wave length of 2537 Å. in the presence of mercury vapor at a temperature in the range between 80° and 650° F. at a pressure sufficient to maintain a vapor phase at a residence time in said reaction zone of about 4 minutes to form a saturated product having a branched structure and the same number of carbon atoms as the sum of the carbon atoms of the first and second hydrocarbons, and recovering said product.

2. A method for reacting a first saturated hydrocarbon with a second saturated hydrocarbon which includes the steps of forming a mixture of first and second hydrocarbons having from 1 to 7 carbon atoms in the molecule in the inverse proportion of the number of occurrences of the weakest carbon-hydrogen bond in each molecule of said hydrocarbons, flowing said mixture continuously through a reaction zone, exposing said mixture in said reaction zone to a resonance frequency radiation in the presence of mercury as a metal sensitizing agent at a reaction temperature in the range between 80° and 650° F., at a pressure at least atmospheric, and at a residence time in said reaction zone of approximately 4 minutes to form a saturated product having a branched structure, said resonance frequency corresponding at least to one of the resonance lines of the metal sensitizing agent, and recovering said product.

3. A method for reacting a first saturated hydrocarbon with a second saturated hydrocarbon which includes the steps of forming a mixture of first and second saturated hydrocarbons having from 1 to 7 carbon atoms in the molecule in a mol ratio expressed by the formula:

$$\frac{N_2}{N_1} e^{\frac{E_1 - E_2}{2RT}}$$

where $N_1$ is the number of hydrogen atoms held by the weakest bond in the molecule of said first hydrocarbon;

$N_2$ is the number of hydrogen atoms held by the weakest bond in the molecule of said second hydrocarbon;

$E_1$ is the energy in calories per mol of the weakest carbon-hydrogen bond of said first hydrocarbon;

$E_2$ is the energy in calories per mol of the weakest carbon-hydrogen bond of said second hydrocarbon;

$e$ is 2.718;

$R$ is 1.986 calories per degree Kelvin per mol; and $T$ is the temperature in degrees Kelvin at which the reaction is conducted, flowing said mixture continuously through a reaction zone, exposing said mixture in said reaction zone to a resonance frequency radiation in the presence of mercury as a metal sensitizing agent at a temperature in the range from 80° to 650° F., at a pressure at least atmospheric, and at a residence time in said reaction zone of approximately 4 minutes to cause reaction of said saturated hydrocarbons to form a saturated branched hydrocarbon product, said resonance frequency corresponding at least to one of the resonance lines of the metal sensitizing agent, and recovering said product.

4. A method for reacting a mixture of a first and second saturated hydrocarbon having from 1 to 7 carbon atoms in the molecule in which the first and second hydrocarbons are present in the mixture in the mol ratio expressed by the formula:

$$\frac{N_2}{N_1} e^{\frac{E_1-E_2}{2RT}}$$

where $N_1$ is the number of hydrogen atoms held by the weakest bond in the molecule of said first hydrocarbon;

$N_2$ is the number of hydrogen atoms held by the weakest bond in the molecule of said second hydrocarbon;

$E_1$ is the energy in calories per mol of the weakest carbon-hydrogen bond of said first hydrocarbon;

$E_2$ is the energy in calories per mol of the weakest carbon-hydrogen bond of said second hydrocarbon;

$e$ is 2.718;

R is 1.986 calories per degree Kelvin per mol; and

T is the temperaure in degrees Kelvin at which the reaction is conducted, flowing said mixture continuously through a reaction zone, exposing said mixture in said reaction zone to a resonance frequency radiation in the presence of mercury as a metal sensitizing agent at a temperature in the range from 80° to 650° F., at a pressure at least atmospheric, and at a residence time in said reaction zone of approximately 4 minutes to cause reaction of said saturated hydrocarbons to form a saturated branched hydrocarbon product, said resonance frequency corresponding at least to one of the resonance lines of the metal sensitizing agent, and recovering said product.

5. A method for reacting a mixture of a first and second saturated hydrocarbon having from 1 to 7 carbon atoms in the molecule in which said first and second hydrocarbons are present in the mixture in a mol ratio in the range from ½ to 2 times the value expressed by the formula:

$$\frac{N_2}{N_1} e^{\frac{E_1-E_2}{2RT}}$$

where $N_1$ is the number of hydrogen atoms held by the weakest bond in the molecule of said first hydrocarbon;

$N_2$ is the number of hydrogen atoms held by the weakest bond in the molecule of said second hydrocarbon;

$E_1$ is the energy in calories per mol of the weakest carbon-hydrogen bond of said first hydrocarbon;

$E_2$ is the energy in calories per mol of the weakest carbon-hydrogen bond of said second hydrocarbon;

$e$ is 2.718;

R is 1.986 calories per degree Kelvin per mol; and

T is the temperature in degrees Kelvin at which the reaction is conducted, flowing said mixture continuously through a reaction zone, exposing said mixture in said reaction zone to a resonance frequency radiation in the presence of mercury as a metal sensitizing agent at a temperature in the range from 80° to 650° F., at a pressure at least atmospheric, and at a residence time in said reaction zone of approximately 4 minutes to cause reaction of said saturated hydrocarbons to form a saturated branched hydrocarbon product, said resonance frequency corresponding at least to one of the resonance lines of the metal sensitizing agent, and recovering said product.

6. A method for producing highly branched hydrocarbons which comprises forming a mixture of propane and isobutane in the ratio of 6.9:1, flowing the mixture continuously through a reaction zone, exposing said mixture in said reaction zone to a resonance frequency radiation of a wave length of 2537 Å. in the presence of mercury vapor at a temperature of 275° F. and at atmospheric pressure, and at a residence time in said reaction zone of approximately 4 minutes to cause reaction between said hydrocarbons to form a product containing substantial amounts of 2,3,3-trimethyl butane and lesser amounts of 2,3-dimethyl butane and 2,2,3,3-tetramethyl butane, and recovering said product.

HARRY E. CIER.

References Cited in the file of this patent

UNITED STATES PATENTS

| Number | Name | Date |
|---|---|---|
| 1,746,168 | Taylor | Feb. 4, 1930 |
| 2,462,669 | Percy | Feb. 22, 1949 |

FOREIGN PATENTS

| Number | Country | Date |
|---|---|---|
| 307,406 | Great Britain | Mar. 4, 1929 |

OTHER REFERENCES

Roberts et al., Transactions Faraday Soc., vol. 45 (1949), pp. 339–57.

Ellis et al., Chemical Action of Ultraviolet Rays (1941), pp. 257–9.

Olson et al., Journal Amer. Chem. Soc., vol. 48 (February 1926), pp. 389–96.

Taylor et al., Journ. Amer. Chem. Soc., vol. 51 (October 1929), pp. 2922–36.

Steacie et al., Journ. Chemical Physics, vol. 12 (January 1944), pp. 34–36.

Le Roy, Canadian Chemistry and Process Industries, June 1944, pp. 430–31.